US006378229B1

(12) United States Patent
Hartel et al.

(10) Patent No.: US 6,378,229 B1
(45) Date of Patent: Apr. 30, 2002

(54) METHOD FOR THE SUB-CRITICAL DRYING OF LYOGELS TO PRODUCE AEROGELS

(75) Inventors: Johannes Hartel, Bad Soden; Rainald Forbert, Flörsheim, both of (DE)

(73) Assignee: Cabot Corporation, Boston, MA (US)

(*) Notice: Subject to any disclaimer, the term of this patent is extended or adjusted under 35 U.S.C. 154(b) by 0 days.

(21) Appl. No.: 09/594,000

(22) Filed: Jun. 14, 2000

Related U.S. Application Data

(63) Continuation of application No. PCT/EP98/08244, filed on Dec. 16, 1998.

(30) Foreign Application Priority Data

Dec. 19, 1997 (DE) .......................................... 197 56 633

(51) Int. Cl.$^7$ .................................................. F26B 5/00
(52) U.S. Cl. ............................. 34/452; 34/329; 34/342; 34/337
(58) Field of Search .................... 34/329, 330, 418, 34/419, 420, 444, 452, 510, 342, 337; 252/315.01, 315.1, 315.6, 315.7; 264/232, 234, 299, 621

(56) References Cited

U.S. PATENT DOCUMENTS

| 2,093,454 | A | 9/1937 | Kistler |
| 2,541,137 | A | 2/1951 | Warrick |
| 2,680,696 | A | 6/1954 | Broge |
| 2,786,042 | A | 3/1957 | Iler |
| 2,886,460 | A | 5/1959 | Alexander et al. |
| 2,978,298 | A | 4/1961 | Wetzel |
| 3,015,645 | A | 1/1962 | Tyler |
| 3,024,126 | A | 3/1962 | Brown |

(List continued on next page.)

FOREIGN PATENT DOCUMENTS

| CH | 528 298 | 1/1969 |
| DE | 296 898 | 12/1915 |
| DE | 896 189 | 11/1953 |
| DE | 1 677 078 | 5/1971 |
| DE | 2 103 243 | 8/1972 |
| DE | 3 025 437 | 4/1980 |
| DE | 3 329 016 | 2/1985 |
| DE | 261 581 | 11/1988 |
| DE | 43 42 548 | 12/1993 |
| DE | 44 04 701 | 2/1994 |
| DE | 44 37 424 | 10/1994 |
| DE | 43 16 540 | 11/1994 |
| DE | 195 06 141 | 2/1995 |
| DE | 195 41 279 | 6/1995 |
| DE | 195 34 198 | 9/1995 |
| DE | 195 41 715 | 9/1995 |
| DE | 195 41 992 | 10/1995 |
| DE | 195 37 821 | 11/1995 |
| DE | 196 31 267 | 2/1996 |
| DE | 44 30 669 | 3/1996 |
| DE | 195 02 453 | 9/1996 |
| DE | 196 48 798 | 11/1998 |
| EP | 0 031 166 | 7/1981 |
| EP | 0 171 722 | 2/1986 |
| EP | 0 199 930 | 11/1986 |
| EP | 0 396 076 | 4/1990 |
| EP | 0 552 484 | 7/1993 |
| EP | 0 589 350 | 3/1994 |
| EP | 0 658 513 | 12/1994 |
| GB | 607234 | 8/1948 |
| GB | 682574 | 3/1951 |
| GB | 783868 | 10/1955 |
| WO | WO 92/03378 | 3/1992 |
| WO | WO 92/20623 | 11/1992 |
| WO | WO 94/22943 | 10/1994 |
| WO | WO 94/25149 | 11/1994 |
| WO | WO 95/03358 | 2/1995 |
| WO | WO 95/06617 | 3/1995 |
| WO | WO 96/06809 | 3/1996 |
| WO | WO 96/14266 | 5/1996 |
| WO | WO 96/15997 | 5/1996 |
| WO | WO 96/19607 | 6/1996 |
| WO | WO 96/22942 | 8/1996 |
| WO | WO 96/25850 | 8/1996 |
| WO | WO 96/25950 | 8/1996 |
| WO | WO 97/10187 | 3/1997 |
| WO | WO 97/10188 | 3/1997 |
| WO | WO 97/17287 | 5/1997 |
| WO | WO 97/17288 | 5/1997 |
| WO | WO 97/18161 | 5/1997 |
| WO | WO 97 32662 A | 12/1997 |
| WO | WO 98/05591 | 2/1998 |
| WO | WO9823366 | 6/1998 |
| WO | WO9936356 | 7/1999 |
| WO | WO9936358 | 7/1999 |
| WO | WO9936479 | 7/1999 |
| WO | WO9936480 | 7/1999 |
| WO | WO 99/64504 | 12/1999 |

OTHER PUBLICATIONS

Gesser, H.D. et al. *Chem. Rev*, 89, 765 (1989).
Kistler, S.S. *Nature*, 227, 741 (1931).
Ulmann's Encyclopedia of Industrial Chemistry, p. 630, Wiley VCH–Verlag GmbH.
Urbank, W. React. Kinet. Catal. Lett., 34, 129 (1987).
International Search Report—PCT/EP 98/02519, Sep. 10, 1998.
International Search Report—PCT/EP 97/06595, May 12, 1998.
International Search Report—PCT/EP 98/02283.
EPO Search Report TS 68015, Feb. 24, 1998.
Gesser, H.D., *Chem.Rev.* 1989, 89, 765–788, American Chemical Society.
International Search Report—PCT/EP 98/08244, Apr. 27, 1999.

*Primary Examiner*—Pamela Wilson

(57) ABSTRACT

The present invention refers to a method for the sub-critical drying of lyogels to produce aerogels. The method for the sub-critical drying of lyogels to produce aerogels provides for the lyogel particles to be disposed as a fixed bed and for a drying gas to be passed through them.

12 Claims, No Drawings

U.S. PATENT DOCUMENTS

| | | | |
|---|---|---|---|
| 3,122,520 A | | 2/1964 | Lentz |
| 3,615,142 A | | 10/1971 | Dahlbom |
| 3,794,713 A | | 2/1974 | Aboutboul |
| 3,872,217 A | | 3/1975 | Merz |
| 4,101,442 A | | 7/1978 | Rosen |
| 4,101,443 A | | 7/1978 | Rosen |
| 4,190,457 A | | 2/1980 | McDaniel |
| 4,344,800 A | | 8/1982 | Lutz |
| 4,704,374 A | | 11/1987 | Jacques |
| 4,873,218 A | | 10/1989 | Pekala |
| 4,888,369 A | | 12/1989 | Moore |
| 4,906,676 A | | 3/1990 | Ida |
| 4,950,502 A | | 8/1990 | Saam |
| 5,001,183 A | | 3/1991 | Sands |
| 5,009,874 A | | 4/1991 | Parmentier |
| 5,069,815 A | | 12/1991 | Aoki et al. |
| 5,081,163 A | | 1/1992 | Pekala |
| 5,156,895 A | * | 10/1992 | Martin ............... 428/72 |
| 5,215,733 A | | 6/1993 | Potter |
| 5,275,796 A | | 1/1994 | Tillotson |
| 5,294,480 A | * | 3/1994 | Mielke et al. ............ 428/240 |
| 5,409,683 A | | 4/1995 | Tillotson |
| 5,473,826 A | * | 12/1995 | Kirkbir et al. ............ 34/405 |
| 5,484,818 A | | 1/1996 | De Vos |
| 5,496,527 A | | 3/1996 | Yokogawa |
| 5,508,341 A | | 4/1996 | Mayer |
| 5,556,892 A | | 9/1996 | Pekala |
| 5,561,318 A | | 10/1996 | Gnade |
| 5,565,142 A | | 10/1996 | Deshpande |
| 5,595,593 A | | 1/1997 | Burns |
| 5,625,013 A | | 4/1997 | Mueller |
| 5,651,921 A | | 7/1997 | Kaijou |
| 5,674,962 A | | 10/1997 | Ito et al. |
| 5,680,713 A | | 10/1997 | Forbert et al. ............ 34/342 |
| 5,705,535 A | * | 1/1998 | Jansen et al. ............ 521/64 |
| 5,708,069 A | | 1/1998 | Burns |
| 5,750,610 A | | 5/1998 | Burns |
| 5,866,027 A | | 2/1999 | Frank |
| 5,888,425 A | * | 3/1999 | Schwertfeger et al. ... 252/315.2 |
| 6,080,475 A | | 6/2000 | Frank et al. |
| 6,083,619 A | | 7/2000 | Frank et al. |
| 6,099,792 A | * | 8/2000 | Ganguli et al. ............ 264/621 |
| 6,131,305 A | * | 10/2000 | Forbert et al. ............ 34/342 |
| 6,159,539 A | | 12/2000 | Schwertfeger et al. |
| 6,258,305 B1 | * | 7/2001 | Brinker et al. ............ 264/101 |

\* cited by examiner

METHOD FOR THE SUB-CRITICAL DRYING OF LYOGELS TO PRODUCE AEROGELS

This application is a continuation of PCT/EP98/08244 filed Dec. 16, 1998. The invention relates to a method for the sub-critical drying of lyogels to produce aerogels.

Lyogels are gels which contain a liquid, the dispersing agent. In the particular instance where the gel fluid is water, they are also referred to as hydrogels. In the present Application, the term "lyogel" also includes hydrogels. Aerogels in the wider sense, i.e. in the sense of "gel with air as the dispersant", a suitable gel is produced by drying. The term "aerogels" in this sense includes aerogels in the narrower sense, xerogels and cryogels. In this respect, a dried gel is referred to as an aerogel in the narrower sense if the fluid of the gel is eliminated at temperatures above the critical temperature and starting from pressures which are above the critical pressure. On the other hand, if the fluid of the gel is removed sub-critically, for example with the formation of a fluid-vapour interface, then the resulting gel is also frequently referred to as a xerogel.

Where the use of the term aerogels in the present Application is concerned, there are gels which are sub-critically dried.

Aerogels have a very low density and high porosity for solid substances. Therefore, and on account of the minimal pore size, aerogels, particularly those with porosities of over 60% and densities below 0.6 g/cu.cm, display an extremely low thermal conductivity and are therefore used as heat insulating materials such as are described for instance in EP-A0 171 722.

For industrial applications, aerogels are predominantly used as granulate. For the application, it is in this respect essential for the aerogel granulate to be used to consist of particles of a suitable form, preferably spherical form, and size distribution.

By virtue of their low density, however, aerogels also exhibit low mechanical stability, particularly in respect of sheer loadings and against abrasion.

By reason of the capillary forces which occur in sub-critical drying and the shrinkage involved, not all lyogels are suitable for sub-critical drying to produce an aerogel. During drying, the gel shrinks considerably if the meniscus of the fluid migrates into the interior of the gel, in order, with effect from a certain point in the drying process, to spring back more or less completely into its starting form again. Consequently, depending upon the qualities of the inner gel surface, a certain minimum stability of the gel network is essential, modification of the inner gel surface often being required in order to prevent a reaction by adjacent pore walls in the shrunk condition and a collapse of the gel which this would entail.

Corresponding processes in which the inner surface of an $SiO_2$ lyogel is organically modified and the resulting gel is sub-critically dried to produce an aerogel, are disclosed for example in U.S. Pat. No. 5 565 142, DE-A-43 42 548 and in the unpublished German Patent Application 19648798.

Gels which are unsuitable for sub-critical drying collapse under sub-critical drying, with a loss of the porous structure and therefore they no longer display the favourable properties of aerogels.

According to the gel, surface modification, granular form and size and drying conditions, so gel particles can, during drying, be destroyed on a macroscopic scale, i.e. while retaining the nanoporous structure. It is true that the aerogel retains its properties but on account of the now smaller granular size an irregular or undefined grain shape, it can no longer be used so satisfactorily.

Drying methods which at first sight appear obvious for such drying problems are not readily suited to major industrial production of aerogel granulate of a definite form. By reason of the low density of the aerogels, a fluid bed drying system has been found to be unsuited to major industrial production. In order not to carry the aerogel particles out of the layer, it would be necessary to work below the fluidising point; the necessary gas flow velocities would then be so low that there would be no guarantee of heat being supplied and vapour dispersed in an acceptable time for drying. Were greater gas flow velocities to be used, then the aerogel would not be completely dried since it will be conveyed out of the dryer. Furthermore, in the fluidised phase, gel particles collide with one another so that there is considerable abrasion and grain fracture.

Contact drying proves to be not sufficiently effective since due to the high heat insulating capacity of the aerogels, a transfer of heat into layers more remote from the contact surface does not take place quickly enough so that only minimal layer thicknesses and therefore, in view of the quantities needed, excessively great surface areas would be needed.

In accordance with DE-A-43 16 540, aerogels are dried by dielectric processes. Due to the necessary electrical energy and the relatively high investment for an appropriate drying apparatus, however, these methods are not sufficiently economical.

Therefore, the object of the present invention was to provide a method for the sub-critical drying of lyogels which are suitable for sub-critical drying to produce aerogels and which minimises the destruction of aerogel particles and the abrasion of aerogel particles during drying and which can be used on a large industrial scale.

Surprisingly, the problem is resolved by a method for the sub-critical drying of lyogels to produce aerogels and which is characterised in that the lyogel particles are disposed as a static bed and have a dry gas flowing through them.

Carried out in this way, the drying does not lead to grain fracture or abrasion since the particles are stationary in their bulk. Surprisingly, the drying can be carried out in relatively short times and in layer heights which are considerably for fixed bed drying.

In principle, any lyogels which can be dried sub-critically are suitable for the method, i.e. their gel structure must be sufficiently stable to withstand collapse of the framework by the action of capillary forces and are if necessary suitably surface modified in order for example to prevent a reaction between pore walls in the shrunken condition.

Where the lyogels are concerned, these may according to the type of gel structure be organic or inorganic lyogels. For example, they can be produced on a basis of metal oxides which are suitable for the Sol-gel technical G. J. Brinker, G. W. Scherer, Sol-Gel Science 1990, chapters 2 and 3), such as for example Si- or Al-compounds or on the basis of organic substances which are suitable for the sol-gel technique such as for example melamine formaldehyde condensates (U.S. Pat. No. 5 086 085) or resorcin formaldehyde condensates (U.S. Pat. No. 4 873 218) or even on the basis of mixtures of the above-mentioned materials. Preferably, they are $SiO_2$ gels and particularly preferably organically surface modified $SiO_2$ gels such as are described for example in the unpublished German Patent Application No. 19648798.

Where the gel fluid is concerned, this may in principle be pure substances or mixtures, the gel fluid preferably containing more that 50% by weight of organic solvents, preferably acetone or hexamethyl disiloxane. Naturally, the gel fluid may also contain small quantities of other substances such as for example hydrochloric acid or residues of water.

The lyogel particles can in principle be of any desired form and size but preferably substantially spherical particles with diameters between 100 µm and 5 cm and particularly preferred are those with diameters between 0.5 mm and 5 mm. It is also possible to dry mixtures of particles of different shape and/or different size.

In order to avoid dried and therefore lightweight aerogel particles being blown away, it would among other things be necessary for the velocity of the dry gas flow to be low so that no dried aerogel particles are carried away. However, this results in low gas flows and therefore a very limited energy input. For drying aerogels, a rapid energy input is advantageous. For using relatively high drying gas flow velocities, the bulk must therefore, at those places where the gas flow emerges from the fixed bed, be limited by at least one arrangement which is permeable to the drying gas but not to the particles.

Surprisingly, the fixed bed is preferably and in per se known manner, traversed by the drying gas flow passing through it downwards, so that the arrangement which is permeable to the drying gas but not to the particles is constituted by the carrier of the fixed bed. The drying apparatus which is then to be used is consequently not only simpler and less expensive but grain fracture is also reduced, since the upper layers which press down onto those underneath are the first to be dried. The dried and mechanically sensitive aerogels then lie on the heavier and less dried and also mechanically loadable gel particles and are not heavily loaded mechanically.

For a continuous operation, the fixed bed may also be moved with the carrier, e.g. on a suitable belt. Preferably, the gas flow then passes through the fixed bed crosswise to the direction of movement.

The thickness of the fixed bed in the direction of flow of the drying gas stream can be surprisingly great. Preferably, it is between 20 cm and 100 cm and particularly preferably between 20 and 60 cm.

Any gas suitable for drying can be used as the drying gas; if the gel fluid contains larger fractions of organic solvents, then possibly an inert gas such as nitrogen should be used. The input gas flow can already contain solvent gas which the process allows, in other words a circulatory pattern of gas flow, whereby, as usual, solvent gas is constantly eliminated from the circuit, for example by condensation. To accelerate the drying as a whole, it may be advantageous first to dry the gel in a circulatory fashion but to use fresh drying gas for drying the last residues of gel fluid.

The method according to the invention can be carried out by apparatus known to the man skilled in the art, e.g. fixed bed driers, suitable containers with screen bottoms or suitable drying belts, etc., which may possibly be modified in a manner evident to a man of the art.

Preferably, the method for drying surface modified $SiO_2$ aerogels such as disclosed for example in DE-A-43 42 548 or in the unpublished German Patent Application 196 487 98 will be used.

In this case, if the gel fluid contains more than 50% by weight hexamethyl disiloxane or acetone, then the temperature of the drying gas is preferably between 100° C. and 200° C. and with particular preference between 140° C. and 180° C.

In the case of the said surface modified $SiO_2$ aerogels, the incident flow velocities are preferably in the range between 1 and 40 cm/s and particularly preferably between 5 and 30 cm/s.

Although the method is particularly suitable for producing aerogels with densities below 300 g/cu.cm, it is also possible to use it for drying xerogels of greater density.

The method according to the invention will be described hereinafter with reference to an example of embodiment but without however being limited thereby.

EXAMPLE

A surface modified $SiO_2$ which has been produced in accordance with examples 1 to 4 in the unpublished German Patent Application 1964877798 and which has a sharp grain size distribution around 1 mm diameter is dried in a fixed bed with a height of 50 cm with a stream of nitrogen flowing through the fixed bed from the top downwards at an incident flow velocity of 20 cm/s and with a gas inlet temperature of 160° C. Initially, the gel is dried for 2½ hours in a circulatory manner, the drying gas leaving the fixed bed saturated with moisture and after thorough condensation with a charge of 10 g/kg inert gas, it is again introduced into the fixed bed. Afterwards, drying is continued for half-an-hour with fresh drying gas. The dried aerogel displays virtually no grain fracture and hardly any abrasion.

What is claimed is:

1. A method for the sub-critical drying of lyogels to produce aerogels, characterised in that lyogel particles are disposed as a fixed bed and have drying gas passed through the disposed lyogel particles.

2. A method according to claim 1, characterised in that, at locations which a flow of drying gas emerges from the fixed bed, the fixed bed is bounded by at least one arrangement which is permeable to the drying gas but not to the particles.

3. A method according to claim 2, characterised in that the fixed bed lies on the at least on arrangement which is permeable to the drying gas but not to the particles and has flow passing through the fixed bed from the top downwards.

4. A method according to claim 1, characterised in that the lyogel is an organically modified gel having a framework which comprises $SiO_2$.

5. A method according to claim 4, characterised in that the gel fluid predominantly contains hexamethyl disiloxane.

6. A method according to claim 4, characterised in that the gel fluid predominantly contains acetone.

7. A method according to claim 4, characterised in that the temperature of the drying gas fed to the fixed bed is between 100° C. and 200° C.

8. A method according to claim 6, characterised in that the drying gas is fed to fixed bed at an incident flow velocity between 1 cm/s and 40 cm/s.

9. A method according to claim 1, characterised in that the thickness of the fixed bed is between 20 cm and 100 cm in the direction of flow of the drying gas.

10. A method according to claim 1, characterised in that the drying gas follows a circulatory pattern.

11. A method according to claim 1, characterised in that in a first phase of drying the drying gas is circulated while in a second phase fresh drying gas is used.

12. A method according to claim 2, characterised in that the fixed bed is moving together with the at least one arrangement bounding the fixed bed, a stream of drying gas being passed through the fixed bed crosswise to the direction of movement.

* * * * *